(12) United States Patent
Kim et al.

(10) Patent No.: US 7,813,320 B2
(45) Date of Patent: Oct. 12, 2010

(54) SYSTEM FOR HANDOVER IN BWA COMMUNICATION SYSTEM AND METHOD THEREOF

(75) Inventors: Jung-Won Kim, Seoul (KR); Tae-Won Kim, Yongin-si (KR); Bo-Kyung Wang, Seongnam-si (KR); Yong Chang, Seongnam-si (KR); Hong-Sung Chang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/493,937

(22) Filed: Jun. 29, 2009

(65) Prior Publication Data

US 2009/0262705 A1 Oct. 22, 2009

Related U.S. Application Data

(63) Continuation of application No. 11/146,508, filed on Jun. 7, 2005, now Pat. No. 7,574,210.

(30) Foreign Application Priority Data

Jun. 7, 2004 (KR) ............................... 2004-41542

(51) Int. Cl.
*H04W 4/00* (2009.01)
(52) U.S. Cl. ................... 370/331; 455/437; 455/438; 455/442; 455/443
(58) Field of Classification Search .............. 455/436, 455/437, 438, 442, 443; 370/331
See application file for complete search history.

(56) References Cited

U.S. PATENT DOCUMENTS

| 6,173,181 | B1 | 1/2001 | Losh | |
|---|---|---|---|---|
| 7,194,275 | B2 * | 3/2007 | Bolin et al. | ............... 455/456.6 |
| 2003/0086394 | A1 | 5/2003 | Zeira et al. | |
| 2004/0033804 | A1 * | 2/2004 | Binzel | ........................ 455/437 |
| 2005/0266848 | A1 * | 12/2005 | Kim | ............................ 455/436 |
| 2005/0272481 | A1 | 12/2005 | Kim | |

(Continued)

FOREIGN PATENT DOCUMENTS

EP 1 473 956 11/2004

(Continued)

OTHER PUBLICATIONS

Sohyun Kim et al.: "Inter-Sector HO Scenario", Samsung Electronics, IEEE C802.16e-04/58, May 7, 2004.

*Primary Examiner*—Patrick N Edouard
*Assistant Examiner*—Justin Y Lee
(74) *Attorney, Agent, or Firm*—The Farrell Law Firm, LLP

(57) ABSTRACT

A handover method and system in a communication system. In the method, a serving Base Station (BS) broadcasts neighbor BS information including BS identifiers and preamble indices of a plurality of neighbor BSs, receives a handover request message from a Mobile Station (MS), the handover request message including a first set of at least one BS identifier and at least one preamble index for at least one neighbor BS among the plurality of neighbor BSs, and transmits a handover response message to the MS, the handover response message including a second set of at least one BS identifier and at least one preamble index for at least one recommended neighbor BS.

12 Claims, 8 Drawing Sheets

U.S. PATENT DOCUMENTS

2007/0173256 A1 7/2007 Laroia et al.

FOREIGN PATENT DOCUMENTS

| EP | 1 571 786 | 9/2005 |
| JP | 2001-119745 | 4/2001 |
| JP | 2001-197537 | 7/2001 |
| JP | 2003-348007 | 12/2003 |
| JP | 2006-501785 | 1/2006 |

* cited by examiner

| Syntax | Size | Notes |
|---|---|---|
| MOB-NBR-ADV_Message_Format() { | | |
| Management Message Type = 49 | 8 bits | |
| Operator ID | 24 bits | Unique ID assigned to the operator |
| N_NEIGHBORS | 8 bits | |
| For (j=0 ; j<N_NEIGHBORS ; j++) { | | |
| Neighbor BS-ID | 48 bits | |
| DL Physical Frequency | 32 bits | |
| Reserved | 5 bits | |
| N_sectors | 3 bits | |
| For (i=0; i<N_sectors; i++){ | | |
| Preamble Index | 8 bits | Preamble index is also used as sector ID. |
| } | | |
| Configuration Change Count | 8 bits | Incremented each time the information for the associated neighbor BS has changed. |
| TLV Encoded Neighbor information | Variable | TLV specific |
| } | | |
| HMAC tuple | 21 bytes | See 11.4.11 |
| } | | |

FIG.4

| Syntax | Size | Notes |
|---|---|---|
| MOB-BSHO-REQ_Message_Format() { | | |
| Management Message Type = 52 | 8 bits | |
| Estimated HO start | 8 bits | |
| Network Assisted HO supported | 1 bits | |
| Inter Sector HO | 1 bits | |
| For (j=0 ; j<N_Recommended ; j++) { | | N_Recommended can be derived from the known length of the message |
| Neighbor BS-ID | 48 bits | |
| If (Inter_Sector_HO == 1) { | | |
| Preamble Index | 8 bits | The preamble index of the target sector |
| } | | |
| service level prediction | 8 bits | |
| } | | |
| Reserved | 6 bits | |
| HMAC tuple | 21 bytes | |
| } | | |

FIG.5

| Syntax | Size | Notes |
|---|---|---|
| MOB-MSHO-REQ_Message_Format() { | | |
|   Management Message Type = 53 | 8 bits | |
|   Estimated HO start | 8 bits | |
|   Inter Sector HO | 1 bits | |
|   Reserved | 7 bits | |
|   For (j=0 ; j<N_Recommended ; j++) { | | N_Recommended can be derived from the known length of the message |
|     Neighbor BS-ID | 48 bits | |
|     If (Inter_Sector_HO == 1) { | | |
|       Preamble Index | 8 bits | The preamble index of the target sector |
|     } | | |
|     BS CINR mean | 8 bits | |
|     service level prediction | 8 bits | |
|   } | | |
|   Estimated HO start | 8 bits | The estimated HO time shall be the time for the recommended target BS. |
|   HMAC tuple | 21 bytes | |
| } | | |

FIG.6

| Syntax | Size | Notes |
|---|---|---|
| MOB-BSHO-RSP_Message_Format() { | | |
| Management Message Type = 54 | 8 bits | |
| Estimated HO start | 8 bits | |
| Reserved | 6 bits | |
| Inter Sector HO | 1 bits | |
| For (j=0 : j<N_Recommended : j++) { | | N_Recommended can be derived from the known length of the message |
| Neighbor BS-ID | 48 bits | |
| If (Inter_Sector_HO == 1) { | | |
| Preamble Index | 8 bits | The preamble index of the target sector |
| } | | |
| service level prediction | 8 bits | |
| } | | |
| HMAC tuple | 21 bytes | |
| } | | |

FIG.7

| Syntax | Size | Notes |
|---|---|---|
| MOB-HO-IND_Message_Format() { | | |
| Management Message Type = 56 | 8 bits | |
| Reserved | 5 bits | Reserved: shall be set to zero |
| Inter Sector HO | 1 bits | |
| HO_IND_type | 2 bits | 00: Serving BS release<br>01: HO cancel<br>10: HO reject<br>11: reserved |
| Neighbor BS-ID | 48 bits | |
| If (Inter_Sector_HO == 1) { | | |
| Preamble Index | 8 bits | The preamble index of the target sector |
| } | | |
| HMAC tuple | 21 bytes | |
| } | | |

FIG.8

SYSTEM FOR HANDOVER IN BWA COMMUNICATION SYSTEM AND METHOD THEREOF

PRIORITY

This application is a Continuation Application of U.S. application Ser. No. 11/146,508, which was filed on Jun. 7, 2005, now U.S. Pat. No. 7,574,210, and claims priority under 35 U.S.C. §119 to an application entitled "System for Handover in BWA Communication System and Method Thereof" filed in the Korean Intellectual Property Office on Jun. 7, 2004 and assigned Serial No. 2004-41542, the contents of which are hereby incorporated by reference.

BACKGROUND OF THE INVENTION

1. Field of the Invention

The present invention relates generally to a Broadband Wireless Access (BWA) communication system, and more particularly to a system and a method for handover in a BWA communication system.

2. Description of the Related Art

In the next generation communication system, research is being performed to provide users with services having various Qualities of Service (QoSs) at a high transmission speed. To support such a high transmission speed, the next generation communication system has been developed to ensure mobility and QoS in a BWA communication system capable of performing high speed transmission such as a Wireless Local Area network (LAN) system and a Wireless Metropolitan Area network (MAN) system. A representative communication system of the next generation communication system is the Institute of Electrical and Electronics Engineers (IEEE) 802.16e communication system.

FIG. 1 is a block diagram schematically illustrating a conventional IEEE 802.16e communication system.

Referring to FIG. 1, the IEEE 802.16e communication system has a multi-cell structure. The IEEE 802.16e communication system has multi cells, e.g., a cell 100 and a cell 150. Further, the IEEE 802.16e communication system includes a Base Station (BS) 110 that controls the cell 100, a BS 140 that controls the cell 150, and a plurality of Mobile Stations (MSs), e.g., 111, 113, 130, 151, and 153. The transmission/reception of signals between the BSs 110 and 140 and the MSs 111, 113, 130, 151, and 153 is accomplished using a signal transmission/reception scheme such as an Orthogonal Frequency Division Multiplexing (OFDM) scheme or an Orthogonal Frequency Division Multiple Access (OFDMA) scheme. In FIG. 1, the MS 130 is located in a boundary region (or a handover region) between the cell 100 and the cell 150. Accordingly, the IEEE 802.16e communication system must support handover for the MS 130.

As described above, because the IEEE 802.16e communication system must support mobility of a MS, supporting handover for a MS is important for determining performance of the IEEE 802.16e communication system. That is, it is also necessary to accommodate handover for a MS between a plurality of BSs, handover between BSs in a multi-sector structure supporting a plurality of sectors, and inter-sector handover within the same BS. At the present time, the IEEE 802.16e communication system has proposed only extremely restricted handover processes to support handover for a MS. Accordingly, it is necessary to provide detailed handover processes to support handover for a MS.

SUMMARY OF THE INVENTION

Accordingly, the present invention has been made to solve the above-mentioned problems occurring in the prior art, and it is an object of the present invention to provide a system and a method for handover in a BWA communication system.

It is another object of the present invention is to provide a system and a method for supporting inter-sector handover in a BWA communication system.

It is further another object of the present invention to provide a system and a method for handover, that broadcasts preamble index information of neighbor BSs in a BWA communication system.

It is still another object of the present invention to provide a system and a method for handover, which broadcasts preamble index information of sectors in a BWA communication system.

In accordance with an aspect of the present invention, there is provided a handover method in a communication system. The method includes: broadcasting, by a serving Base Station (BS), neighbor BS information including BS identifiers and preamble indices of a plurality of neighbor BSs; receiving, by a Mobile Station (MS), the neighbor BS information from the serving BS; transmitting, by the MS, a handover request message to the serving BS, the handover request message including a first BS identifier and a first preamble index of a neighbor BS among the plurality of neighbor BSs; receiving, by the serving BS, the handover request message from the MS; transmitting, by the serving BS, a handover response message to the MS, the handover response message including a second BS identifier and a second preamble index of a recommended neighbor BS; receiving, by the MS, the handover response message from the serving BS; transmitting, by the MS, a handover indication message to the serving BS, the handover indication message including target BS information; and receiving, by the serving BS, the handover indication message from the MS. The target BS information includes a third BS identifier and a third preamble index of a target BS.

In accordance with another aspect of the present invention, there is provided a handover system in a communication system. The system includes: a serving Base Station (BS) for broadcasting neighbor BS information including BS identifiers and preamble indices of a plurality of neighbor BSs, receiving a handover request message from a Mobile Station (MS), the handover request message including a first BS identifier and a first preamble index of a neighbor BS among the plurality of neighbor BSs, transmitting a handover response message to the MS, the handover response message including a second BS identifier and a second preamble index of a recommended neighbor BS, and receiving a handover indication message from the MS, the handover indication message including target BS information. The system also includes the MS for receiving the neighbor BS information from the serving BS, transmitting the handover request message to the serving BS, receiving the handover response message from the serving BS, and transmitting the handover indication message to the serving BS. The target BS information includes a third BS identifier and a third preamble index of a target BS.

In accordance with another aspect of the present invention, there is provided a method for a handover by a Mobile Station (MS) in a communication system. The method includes: receiving, by the MS, neighbor Base Station (BS) information including BS identifiers and preamble indices of a plurality of neighbor BSs broadcast from a serving BS; transmitting a handover request message to the serving BS, the handover request message including a first set of at least one BS identifier and at least one preamble index for at least one neighbor BS among the plurality of neighbor BSs; and receiving a handover response message from the serving BS in response to the handover request message. The handover response message includes a second set of at least one BS identifier and at least one preamble index for at least one recommended neighbor BS.

In accordance with another aspect of the present invention, there is provided a method for a handover by a serving Base Station (BS) in a communication system. The method includes: broadcasting, by the serving BS, neighbor BS information including BS identifiers and preamble indices of a plurality of neighbor BSs; receiving a handover request message from a Mobile Station (MS), the handover request message including a first set of at least one BS identifier and at least one preamble index for at least one neighbor BS among the plurality of neighbor BSs; and transmitting a handover response message to the MS. The handover response message includes a second set of at least one BS identifier and at least one preamble index for at least one recommended neighbor BS.

BRIEF DESCRIPTION OF THE DRAWINGS

The above and other objects, features and advantages of the present invention will be more apparent from the following detailed description taken in conjunction with the accompanying drawings, in which:

FIG. 4 is a diagram illustrating a format of a MOB-NBR-ADV message according to an embodiment of the present invention;

FIG. 5 is a diagram illustrating a format of a MOB-BSHO-REQ message according to an embodiment of the present invention;

FIG. 6 is a diagram illustrating a format of a MOB-MSHO-REQ message according to an embodiment of the present invention;

FIG. 7 is a diagram illustrating a format of a MOB-BSHO-RSP message according to an embodiment of the present invention; and FIG. 8 is a diagram illustrating a format of a MOB-HO-IND message according to an embodiment of the present invention.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

The present invention proposes a system and a method for handover, that broadcasts information, particularly, preamble index information, of neighbor Base Stations (BSs) or sectors in a Broadband Wireless Access (BWA) communication system. Specifically, the present invention proposes a system and a method for handover that enables high speed handover to be performed by broadcasting BS identifiers (BS-IDs) of neighbor BSs and preamble indices corresponding to the BS-IDs through a Mobile Neighbor Advertisement (MOB-NBR-ADV) message. In the present invention, the Institute of Electrical and Electronics Engineers (IEEE) 802.16e communication system is described as one example of the BWA communication system. It is natural that a system and a method for handover proposed by the present invention can be applied to all other communication systems as well as the IEEE 802.16e communication system.

Figure 1:
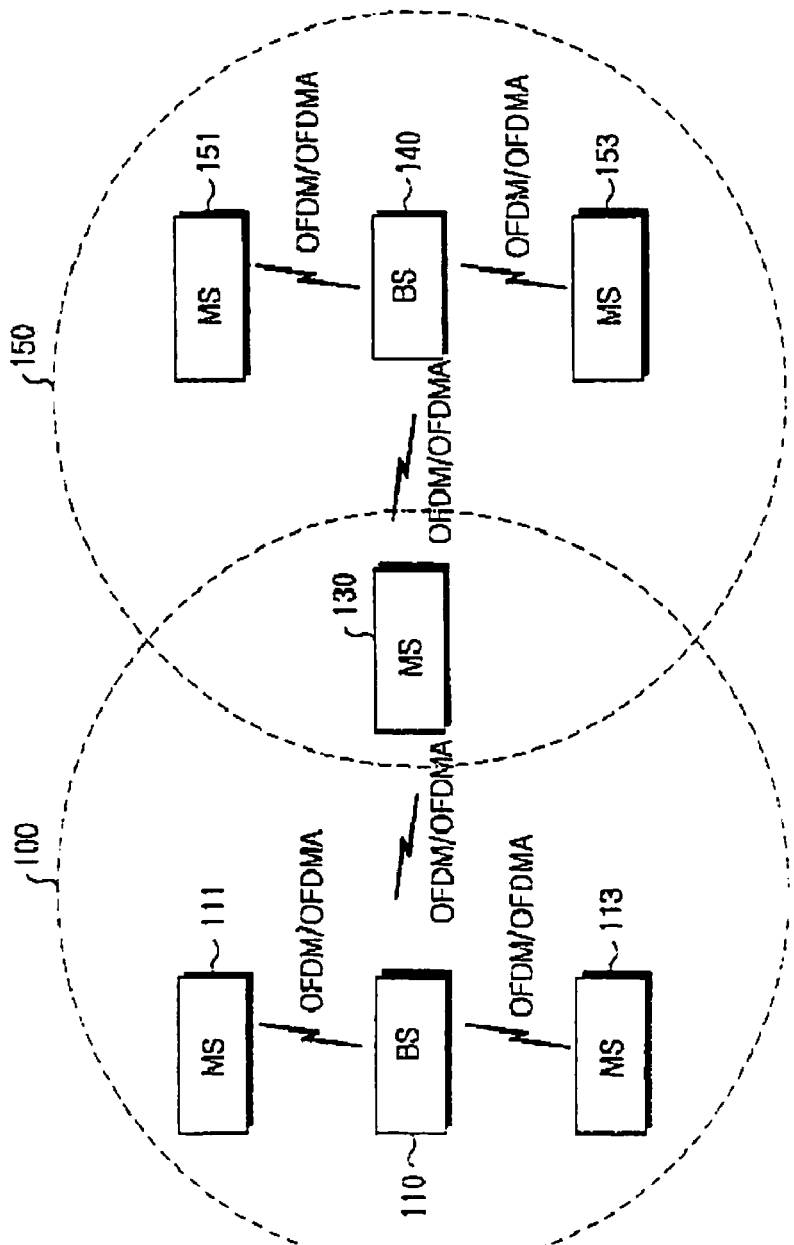
FIG. 1 is a block diagram schematically illustrating a conventional IEEE 802.16e communication system.
Figure 2:
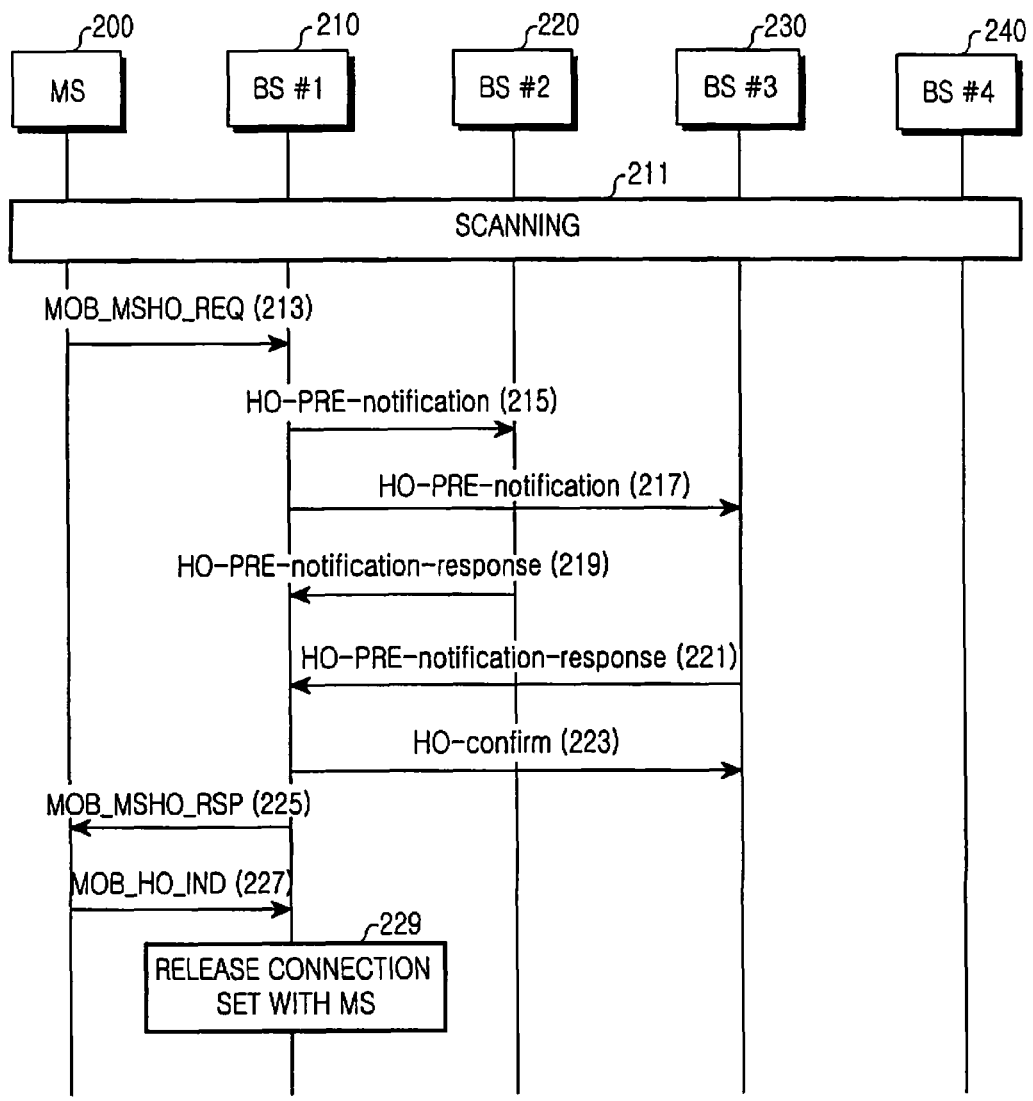
FIG. 2 is a flow diagram illustrating a handover process in an IEEE 802.16e communication system according to an embodiment of the present invention.

FIG. 2 is a flow diagram illustrating a handover process in an IEEE 802.16e communication system according to an embodiment of the present invention.

Referring to FIG. 2, a Mobile Station (MS) performs a scanning operation for one or more neighbor BSs (step 211). In FIG. 2, it is assumed that the neighbor BSs are a second BS(BS#2) 220, a third BS(BS#3) 230 and a fourth BS(BS#4) 240. Hereinafter, the scanning operation will be described.

A first BS 210, acting as a serving BS, broadcasts a MOB-NBR-ADV message, and an MS 200 receives the MOB-NBR-ADV message and acquires information for the one or more neighbor BSs. In the present invention, when the corresponding neighbor BSs support a multi-sector structure, the number of sectors and preamble indices used in the sectors are added to the information for the neighbor BSs included in the MOB-NBR-ADV message, so that the MS 200 can perform a high speed scanning operation for the neighbor BSs in a predetermined interval.

Further, in the present invention, the number of sectors and the preamble indices used in the sectors are added to the MOB-NBR-ADV message as described above, so that handover between BSs including a multi-sector structure can be performed. When the neighbor BSs do not support the multi-sector structure, only the preamble indices used in the neighbor BSs are added to the MOB-NBR-ADV message, so that the MS 200 can perform a high speed scanning operation for the neighbor BSs in a predetermined interval. Because the information for the neighbor BSs included in the MOB-NBR-ADV message will be described in detail later, their detailed description is omitted here.

After acquiring the information for the neighbor BSs, the MS 200 transmits a Mobile Scanning Interval Allocation Request (MOB-SCN-REQ) message to the first BS 210 when the MS 200 intends to scan intensities [e.g., CINRs (Carrier to Interference and Noise Ratios)] of reference signals (e.g., pilot signals) transmitted from the neighbor BSs, i.e., the second BS 220, the third BS 230 and the fourth BS 240. In the following description, it is assumed that a preamble signal is one example of the pilot signal. For convenience of description, it is noted that the pilot signal is used together with the preamble signal.

The MOB-SCN-REQ message includes information, which is desired by the MS 200 and relates to the scanning for the pilot signal, and a 'Scanning Interval'. The time during which the MS scans for available BS will be referred to as a Scanning Interval. The Scanning Interval will be used equal to 'Scan Duration' in present invention. for the CINRs of the pilot signals transmitted from the one or more neighbor BSs. The 'Scan Duration' is expressed by the frame unit. Because a timing point at which the MS 200 wants to perform the scanning operation has no direct connection to the present invention, its detailed description is omitted here.

After receiving the MOB-SCN-REQ message from the MS 200, the first BS 210 transmits a Mobile Scanning Interval Allocation Response (MOB-SCN-RSP) message to the MS 200, which is a response to the MOB-SCN-REQ message. The MOB-SCN-RSP message includes information for the pilot signal scanning to be performed by the MS 200. That is, the information includes the 'Scan Duration', a 'Duration' for which the MS 200 performs the scanning, and a 'Start Frame' indicating information for a timing point at which the MS 200 starts the scanning operation. The MS 200, after receiving the MOB-SCN-RSP message from the first BS 210 as described above, performs the pilot signal scanning for the target BSs in response to the information for the pilot signal scanning in the MOB-SCN-RSP message.

After completing the scanning for the neighbor BSs according to the scheme as described above, the MS 200 transmits a Mobile Station Handover Request (MOB-MSHO-REQ) message including information for recommended one or more neighbor BSs to the first BS 210 when the MS 200 determines to perform handover based on a result from the scanning (step 213). As described above, the present invention supports handover to a BS including a multi-sector structure by adding an 'Inter-sector HO' and a 'Preamble Index' to the information for the recommended one or more neighbor BSs included in the MOB-MSHO-REQ message. The 'Inter-sector HO' indicates if the handover performed by the MS 200 is an inter-sector handover and the 'Preamble Index' indicates a preamble index of a target sector in a final target BS to which the MS 200 is to be handed over when the handover performed by the MS 200 is the inter-sector handover. Because the MOB-MSHO-REQ message will be described later, its detailed description is omitted here.

After receiving the MOB-MSHO-REQ message from the MS 200, the first BS 210 transmits a HO-PRE-NOTIFICATION message to the recommended one or more neighbor BSs (i.e., the second BS 220 and the third BS 230) included in the MOB-MSHO-REQ message (steps 215 and 217). The HO-PRE-NOTIFICATION message includes a plurality of Information Elements (IEs), that is, a MS identifier (ID) of the MS 200, information for time predicted as start time of handover by the MS 200, bandwidth information requested from the MS 200 to a final target BS to be a new serving BS, and QoS information requested from the MS 200 to the final target BS.

After receiving the HO-PRE-NOTIFICATION message from the first BS 210, the second BS 220 and the third BS 230 transmit HO-PRE-NOTIFICATION-RESPONSE messages to the first BS 210 in response to the HO-PRE-NOTIFICATION message (steps 219 and 221). The HO-PRE-NOTIFICATION-RESPONSE message includes the MS ID of the MS 200 included in the HO-PRE-NOTIFICATION message, and bandwidth and QoS information capable of being provided by a corresponding BS when the MS has been handed over to the corresponding BS.

The first BS 210 analyzes the HO-PRE-NOTIFICATION-RESPONSE messages received from the second BS 220 and the third BS 230, and selects a BS, that can optimally provide bandwidth and QoS requested by the MS 200 when the MS 200 is handed over to the BS, as the final target BS. In FIG. 2, it is assumed that the third BS 230 has been selected as the final target BS. Then, the first BS 210 transmits a HO-CONFIRM message to the third BS 230 to report that the MS 200 is to be handed over to the third BS 230 (step 223).

Further, the first BS 210 transmits a Mobile Handover Response (MOB-MSHO-RSP) message the MS 200 (step 225). The MOB-MSHO-RSP message includes information for the final target BS (i.e., the third BS 230) to which the MS 200 is to be handed over. Because the MOB-MSHO-RSP message is a response to the MOB-MSHO-REQ message, the MOB-MSHO-RSP message includes information added to the MOB-MSHO-REQ message. However, because this will be described later, its detailed description is omitted here.

The MS 200, after receiving the MOB-MSHO-RSP message, transmits a Mobile Handover Indication (MOB-HO-IND) message to the first BS 210 in response to the MOB-MSHO-RSP message (step 227). The MOB-HO-IND message includes information added to the MOB-MSHO-REQ message, the MOB-MSHO-RSP message, etc. However, because this will be described later, its detailed description is omitted here.

The first BS 210 after receiving the MOB-HO-IND message releases connection having been set with the MS 200 (step 229). As described above, because the MS 200 has already known the final target BS or a preamble index of a corresponding sector in the final target BS, it is also possible to perform a high speed network reentry to the final target BS according to the handover.

FIG. 2 illustrates an exemplary case in which the MS 200 determines handover from the first BS 210 (the serving BS) to another BS and requests the handover to the first BS 210, that is, handover requested by the MS 200. However, it is natural that the first BS 210 may request the handover to the MS 200 by an unsolicited scheme even without the request of the MS 200, due to a road balancing, etc. In this case, the first BS 210 transmits a Base Station Handover Request (MOB-BSHO-REQ) message to the MS 200 in order to request the MS 200 to perform the handover.

Figure 3:
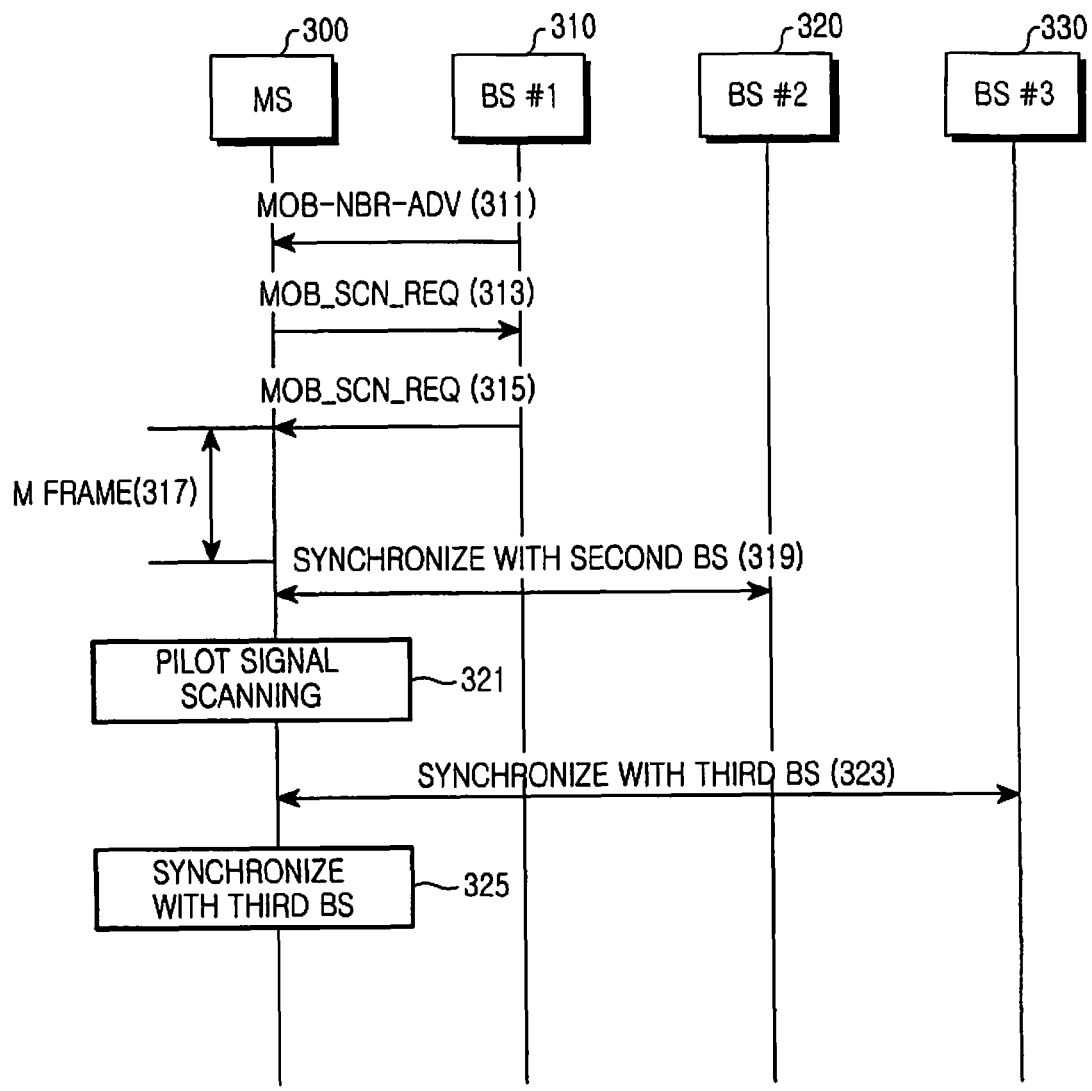
FIG. 3 is a flow diagram illustrating a scanning process in an IEEE 802.16e communication system according to an embodiment of the present invention.

FIG. 3 is a flow diagram illustrating a scanning process in an IEEE 802.16e communication system according to an embodiment of the present invention.

Referring to FIG. 3, a first BS 310, i.e., a serving BS of an MS 300, broadcasts a MOB-NBR-ADV message (step 311). In FIG. 3, it is assumed that neighbor BSs are a second BS 320 and a third BS 330. The MOB-NBR-ADV message is a message newly proposed by the present invention, that may be generated by changing a format of a general MOB-NBR-ADV message in the IEEE 802.16e communication system or by using a new format.

FIG. 4 is a diagram illustrating a format of a MOB-NBR-ADV message according to an embodiment of the present invention.

Referring to FIG. 4, the MOB-NBR-ADV message includes a plurality of IEs, that is, the 'Management Message Type' indicating a type of a currently transmitted message, the 'Operation ID' indicating a network identifier (ID), the 'N_NEIGHBORS' indicating the number of neighbor BSs, the 'NEIGHBOR BS-ID' indicating IDs of the neighbor BSs, the 'DL Physical Frequency' indicating a downlink (DL) physical channel frequency of the neighbor BSs, the 'N_sectors' indicating the number of sectors in a corresponding neighbor BS, the 'Preamble Index' indicating preamble index of a corresponding sector, the 'Configuration Change Count' indicating the number of times by which a configuration changes, the 'TLV (Type, Length, Value) Encoded Neighbor Information' indicating extra information relating to the neighbor BS, a 'Reserved' prepared for an additional purpose, etc.

As illustrated in FIG. 4, the MOB-NBR-ADV message newly proposed by the present invention enables the MS to perform a high speed scanning for neighbor BSs in a predetermined scanning duration by allowing the MS to recognize, in advance, the number of sectors in a corresponding neighbor BS and preamble indices of preambles used in corresponding sectors, after adding the 'N_sectors' and the 'Preamble Index' to a general MOB-NBR-ADV message used in the IEEE 802.16e communication system.

As described above, after the first BS 310 broadcasts the MOB-NBR-ADV message, the MS 300 receives the MOB-NBR-ADV message broadcasted from the first BS 310 and acquires information for the neighbor BSs at step 311. After acquiring the information for the neighbor BSs, the MS 300 transmits a MOB-SCN-REQ message to the first BS 310 when the MS 300 intended for scanning of intensities (e.g., CINRs) of pilot signals transmitted from the neighbor BSs, i.e., the second BS 320 and the third BS 330 (step 313).

After receiving the "MOB-SCN-REQ" message from the MS 300, the first BS 310 transmits a "MOB-SCN-RSP" message to the MS 300 in response to the MOB-SCN-REQ message at step 315. The MOB-SCN-RSP message includes information for the pilot signal scanning to be performed by the MS 300, a 'Duration' for which the MS 300 performs the scanning, and a 'Start Frame' indicating information for a timing point at which the MS 300 starts the scanning operation. It is assumed that the 'Duration' is expressed by N frames and the 'Start Frame' is expressed by M frames in FIG. 3. The MS 300 after receiving the MOB-SCN-RSP message from the first BS 310 as described above performs the pilot signal scanning for the neighbor BSs in response to the information for the pilot signal scanning included in the MOB-SCN-RSP message.

First, the MS 300 waits for the M frames from a timing point at which the MS 300 has received the MOB-SCN-RSP message in response to the 'Start Frame' included in the MOB-SCN-RSP message (step 317), and performs the pilot signal scanning operation for the second BS 320 and the third BS 330. That is, the MS 300 synchronizes with the second BS 320 during the N frames (Duration) (step 319), and performs the pilot signal scanning (step 321). Further, the MS 300 synchronizes with the third BS 330 (step 323), and performs the pilot signal scanning (step 325).

As described above, because the MOB-NBR-ADV message includes preamble indices of preamble signals used in a corresponding neighbor BS and the MS 300 performs the pilot signal scanning in response to the preamble indices, the MS 300 can perform the pilot scanning at a high speed. Thus, it is possible to perform the pilot scanning for all neighbor BSs within the duration. The high speed pilot scanning enables a high speed processing relating to handover of the MS 300 to be accomplished in selection of a recommended target BS, etc. As a result, high speed handover can be achieved.

Description with reference to FIG. 3 discusses the pilot signal scanning operation when the neighbor BSs do not support the multi-sector structure. However, when the neighbor BSs support the multi-sector structure as described above, the MS 300 performs the pilot signal scanning in response to preamble indices of sectors in the neighbor BSs because the preamble indices are included in the MOB-NBR-ADV message. Therefore, the MS 300 can perform the pilot scanning at a high speed. Consequently, it is possible to perform the pilot scanning for sectors in all neighbor BSs within the duration.

FIG. 5 is a diagram illustrating a format of a MOB-BSHO-REQ message according to an embodiment of the present invention.

Referring to FIG. 5, the MOB-BSHO-REQ message includes a plurality of IEs, that is, the 'Management Message Type' indicating a type of a currently transmitted message, the 'Estimated HO start' indicating time predicted as start time of handover, the 'Network Assisted HO supported' indicating if network assisted handover is supported, the 'Inter Sector HO' indicating if handover is inter-sector handover, the 'Neighbor BS-ID' indicating identifiers of recommended target BSs to which a MS can be handed over from among neighbor BSs, the 'Preamble Index' indicating preamble Indices of sectors when the 'Inter Sector HO' indicates the inter-sector handover, the 'service level prediction' indicating a service level capable of being provided by the recommended BSs, a 'Reserved' prepared for an additional purpose, etc.

As illustrated in FIG. 5, because the present invention supports the handover between BSs including the multi-sector structure, the high speed scanning and the high speed handover, the 'Inter Sector HO', the 'Preamble Index', etc., are additionally inserted into a general MOB-BSHO-REQ message of the IEEE 802.16e communication system. When the recommended target BSs do not support the multi-sector structure, only the 'Preamble Index' used in the recommended target BSs may also be inserted into the general MOB-BSHO-REQ message of the IEEE 802.16e communication system. Further, the present invention illustrates an exemplary case in which additional information is inserted into the general MOB-BSHO-REQ message of the IEEE 802.16e communication system. However, the MOB-BSHO-REQ message may also be generated as in a new format.

FIG. 6 is a diagram illustrating a format of a MOB-MSHO-REQ message according to an embodiment of the present invention.

Referring to FIG. 6, the MOB-MSHO-REQ message includes a plurality of IEs, that is, the 'Management Message Type' indicating a type of a currently transmitted message, the 'Estimated HO start' indicating time predicted as start time of handover, the 'Inter Sector HO' indicating if handover is inter-sector handover, the 'Neighbor BS-ID' indicating identifiers of recommended target BSs to which a MS can be handed over from among neighbor BSs, the 'Preamble Index' indicating preamble Indices of sectors when the 'Inter Sector HO' indicates the inter-sector handover, the 'BS CINR mean' indicating a CINR of pilot signals of the recommended target BSs, which has been measured by the MS, the 'service level prediction' indicating a service level capable of being provided by the recommended BSs, a 'Reserved' prepared for an additional purpose, etc.

As illustrated in FIG. 6, because the present invention supports the handover between BSs including the multi-sector structure, the high speed scanning and the high speed handover, the 'Inter Sector HO', the 'Preamble Index', etc., are additionally inserted into a general MOB-MSHO-REQ message of the IEEE 802.16e communication system. When the recommended target BSs do not support the multi-sector structure, only the 'Preamble Index' used in the recommended target BSs may also be inserted into the general MOB-MSHO-REQ message of the IEEE 802.16e communication system. Further, the present invention illustrates an exemplary case in which additional information is inserted into the general MOB-MSHO-REQ message of the IEEE 802.16e communication system. However, the MOB-MSHO-REQ message may also be generated in a new format.

FIG. 7 is a diagram illustrating a format of a MOB-BSHO-RSP message according to an embodiment of the present invention.

Referring to FIG. 7, the MOB-BSHO-RSP message includes a plurality of IEs, that is, the 'Management Message Type' indicating a type of a currently transmitted message, the 'Estimated HO start' indicating time predicted as start time of handover, the 'Inter Sector HO' indicating if handover is inter-sector handover, the 'Neighbor BS-ID' indicating identifiers of recommended target BSs to which a MS can be handed over from among neighbor BSs, the 'Preamble Index' indicating preamble Indices of sectors when the 'Inter Sector HO' indicates the inter-sector handover, the 'service level prediction' indicating a service level capable of being provided by the recommended BSs, a 'Reserved' prepared for an additional purpose, etc.

As illustrated in FIG. 7, because the present invention supports the handover between BSs including the multi-sector structure, the high speed scanning and the high speed handover, the 'Inter Sector HO', the 'Preamble Index', etc., are additionally inserted into a general MOB-BSHO-RSP message of the IEEE 802.16e communication system. When the recommended target BSs do not support the multi-sector structure, only the 'Preamble Index' used in the recommended target BSs may also be inserted into the general MOB-BSHO-RSP message of the IEEE 802.16e communication system. Further, the present invention illustrates an exemplary case in which additional information is inserted into the general MOB-BSHO-RSP message of the IEEE 802.16e communication system. However, the MOB-BSHO-RSP message may also be generated in a new format.

FIG. 8 is a diagram illustrating a format of a MOB-HO-IND message according to an embodiment of the present invention.

Referring to FIG. 8, the MOB-HO-IND message includes a plurality of IEs, that is, the 'Management Message Type' indicating a type of a currently transmitted message, the 'Inter Sector HO' indicating if handover is inter-sector handover, the 'HO_IND_type' indicating if handover to the final target BS has been determined, cancelled or rejected, the 'Neighbor BS-ID' indicating a BS identifier of the final target BS when the handover of the MS to the final target BS has been determined, the 'Preamble Index' indicating preamble Indices of sectors when the 'Inter Sector HO' indicates the inter-sector handover, a 'Reserved' prepared for an additional purpose, etc.

As illustrated in FIG. 8, because the present invention supports the handover between BSs including the multi-sector structure, the high speed scanning and the high speed handover, the 'Inter Sector HO', the 'Preamble Index', etc., are additionally inserted into a general MOB-HO-IND message of the IEEE 802.16e communication system. When the final target BS does not support the multi-sector structure, only the 'Preamble Index' used in the final target BS may also be inserted into the general MOB-HO-IND message of the IEEE 802.16e communication system. Further, the present invention illustrates an exemplary case in which additional information is inserted into the general MOB-HO-IND message of the IEEE 802.16e communication system. However, the MOB-HO-IND message may also be generated in a new format.

Although the detailed description is not given in the present application, when a serving Base Station and a neighbor BS use a common frequency band, the MS can request directly the serving Base Station to perform a handover without performing a scanning operation, i.e., without transmitting MOB-SCN-REQ message. The reason is because it is possible to measure, simultaneously, the strength of preamble signal of base stations using the common frequency band in accordance with PHY modem. Also, it is understood that when the serving Base Station requests a signal strength measurement of the neighbor BSs, the serving Base Station does not require a specific measure interval. That is, when the serving Base Station and the neighbor BS use the common frequency band, the preamble index is notified and thus, it is possible to obtain the more speedy handover by removing unnecessary operation.

As described above, the present invention enables a MS to perform a high speed scanning by notifying in advance the MS of neighbor BSs and preamble indices of sectors in the neighbor BSs through a MOB-NBR-ADV message in a BWA communication system. As a result, it is possible to achieve high speed handover. Further, the present invention enables handover between BSs including a multi-sector structure to be achieved by notifying in advance a MS of a sector index, etc., in a BWA communication system.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A handover method in a communication system, the method comprising:
   broadcasting, by a serving Base Station (BS), neighbor BS information including BS identifiers and preamble indices of a plurality of neighbor BSs;
   receiving, by a Mobile Station (MS), the neighbor BS information from the serving BS;
   transmitting, by the MS, a handover request message to the serving BS, the handover request message including a first BS identifier and a first preamble index of a neighbor BS among the plurality of neighbor BSs;
   receiving, by the serving BS, the handover request message from the MS;
   transmitting, by the serving BS, a handover response message to the MS, the handover response message including a second BS identifier and a second preamble index of a recommended neighbor BS;
   receiving, by the MS, the handover response message from the serving BS;
   transmitting, by the MS, a handover indication message to the serving BS, the handover indication message including target BS information; and
   receiving, by the serving BS, the handover indication message from the MS,
   wherein the target BS information includes a third BS identifier and a third preamble index of a target BS.

2. The method as claimed in claim 1, further comprising:
   requesting, by the MS, allocation of a scanning interval, during which scanning is performed to seek an available BS;
   receiving, by the serving BS, the scanning interval allocation request, from the MS;
   allocating, by the serving BS, a scanning interval to the MS;
   transmitting, by the serving BS, the allocated scanning interval to the MS; and
   receiving, by the MS, the allocated scanning interval from the serving BS.

3. The method as claimed in claim 2, further comprising:
   scanning, by the MS, reference signals received from the plurality of neighbor BSs in the neighbor BS information during the scanning interval; and
   selecting, by the MS, at least one neighbor BS from the plurality of neighbor BSs, when it is necessary to initiate the handover based on a result of the scanning.

4. The method as claimed in claim 1, wherein the handover request message includes at least one channel quality information of the neighbor BS.

5. The method as claimed in claim 1, wherein the neighbor BS information includes a number of sectors used by each of the plurality of neighbor BSs.

6. The method as claimed in claim 1, wherein the first BS identifier, the second BS identifier, and the third identifier are identical.

7. A handover system in a communication system, the system comprising:

a serving Base Station (BS) for broadcasting neighbor BS information including BS identifiers and preamble indices of a plurality of neighbor BSs, receiving a handover request message from a Mobile Station (MS), the handover request message including a first BS identifier and a first preamble index of a neighbor BS among the plurality of neighbor BSs, transmitting a handover response message to the MS, the handover response message including a second BS identifier and a second preamble index of a recommended neighbor BS, and receiving a handover indication message from the MS, the handover indication message including target BS information; and the MS for receiving the neighbor BS information from the serving BS, transmitting the handover request message to the serving BS, receiving the handover response message from the serving BS, and transmitting the handover indication message to the serving BS, wherein the target BS information includes a third BS identifier and a third preamble index of a target BS.

8. The system as claimed in claim 7, wherein the MS requests allocation of a scanning interval, during which scanning is performed to seek an available BS, and receives an allocated scanning interval from the serving BS, and wherein the serving BS receives the scanning interval allocation request, from the MS, allocates the scanning interval to the MS, and transmits the allocated scanning interval to the MS.

9. The system as claimed in claim 8, wherein the MS scans reference signals received from the plurality of neighbor BSs in the neighbor BS information during the scanning interval, and selects at least one neighbor BS from the plurality of neighbor BSs, when it is necessary to initiate the handover based on a result of the scanning.

10. The system as claimed in claim 7, wherein the handover request message comprises at least one channel quality information of the neighbor BS.

11. The system as claimed in claim 7, wherein the neighbor BS information comprises a number of sectors used by each of the plurality of neighbor BSs.

12. The system as claimed in claim 7, wherein the first BS identifier, the second BS identifier, and the third identifier are identical.

\* \* \* \* \*